Aug. 31, 1965 N. T. GENERAL 3,203,278
VARIABLE SPEED FRICTION DRIVE TRANSMISSION
Filed Jan. 2, 1963

Norman T. General
INVENTOR.
BY John R. Faulkner
Robert E. McCollum
ATTORNEYS.

United States Patent Office 3,203,278
Patented Aug. 31, 1965

3,203,278
VARIABLE SPEED FRICTION DRIVE
TRANSMISSION
Norman T. General, Orchard Lake, Mich., assignor to Ford Motor Company, Dearborn, Mich., a corporation of Delaware
Filed Jan. 2, 1963, Ser. No. 248,932
7 Claims. (Cl. 74—690)

This invention relates to a transmission for a motor vehicle, and more particularly to one providing an infinitely variable number of speed ratio changes, a direct drive, and a reverse drive.

One of the objects of the invention is to provide a transmission that is economical to manufacture and is simple in design, and yet provides a plurality of forward speed drive ratios, a neutral, and a reverse drive.

The invention accomplishes the above object by providing a transmission combining the advantages of a variable speed friction drive mechanism and a gearset, and including a hydrodynamic torque transmitting means absorbing and transmitting torque between power input and output shafts. A direct drive is established through the transmission when the friction drive and gearset drive ratios are equalized, which not only eliminates friction losses and therefore increases efficiency of operation by equalizing distribution of loads, but reduces wear of the parts. A selectively operable clutch reverses the direction of rotation of the power output shaft when desired.

Another object of the invention therefore is to provide a transmission combining the advantages of a variable speed drive mechanism and a gearset to provide an infinite number of different drives, with smooth transitions between.

It is a further object of the invention to provide a variable speed friction drive transmission with a selectively engageable clutch to reverse the direction of rotation of the power output shaft and relieve the loading on the friction drive mechanism.

A still further object of the invention is to provide a transmission combining a variable speed friction drive and a planetary gearset wherein a direct drive is obtained upon the attainment of equal speed ratios in the friction drive and gearset thereby reducing the number of loading cycles for the friction drive to a minimum and increasing the efficiency of operation.

Figure 1:
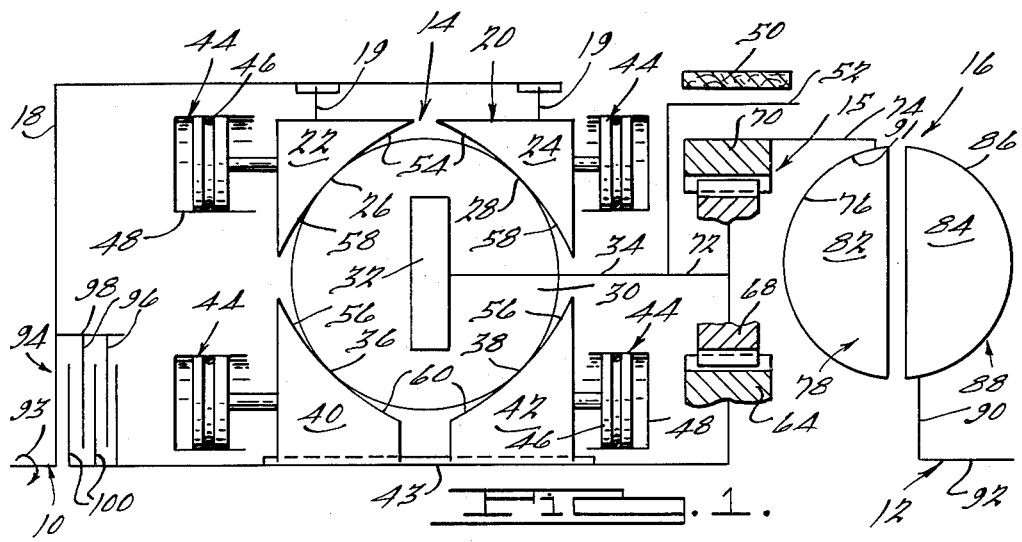
Figure 2:
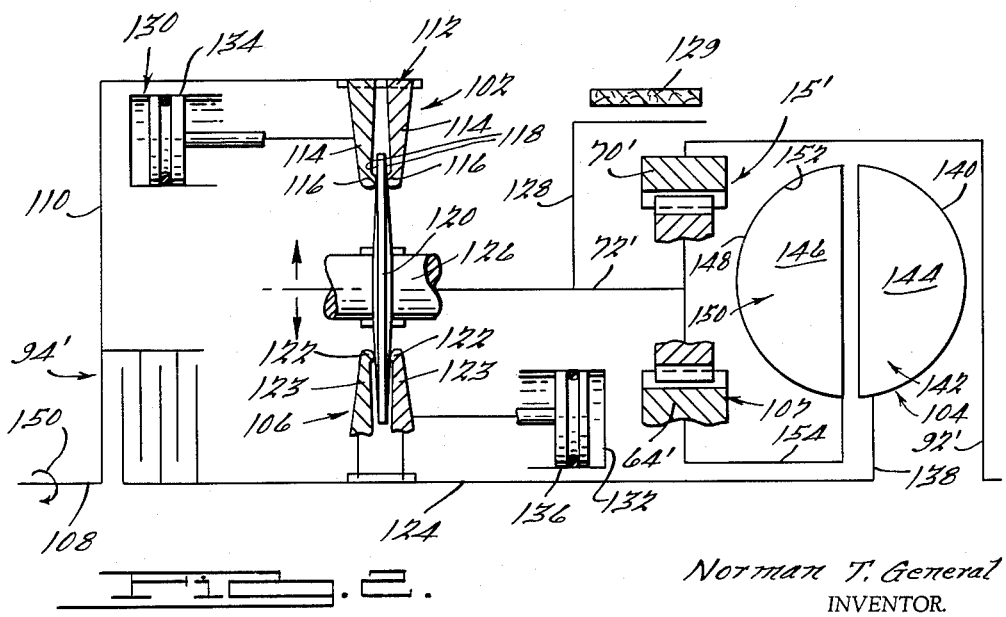

Other objects, features and advantages of the invention will become apparent upon reference to the succeeding, detailed description thereof, and to the drawings illustrating the preferred embodiments thereof; wherein, FIGURE 1 is a schematic illustration of one embodiment of the invention; and, FIGURE 2 is a schematic illustration of another embodiment of the invention.

FIGURE 1 shows, in general, input and output shafts 10 and 12 connected for a drive therebetween by an infinitely variable speed ball friction drive mechanism 14, a planetary gearset 15, and a hydrodynamic drive device or fluid coupling 16. More specifically, shaft 10, which is driven by any suitable source of power, such as, for example, the internal combustion engine of a motor vehicle, is drive connected by a shell member 18 and connectors 19 to the outer annular ball race 20 of the variable speed drive 14. This race is composed of a pair of spaced outer annular ball race members 22 and 24 slidably splined to connectors 19 and having internal concave surfaces 26 and 28. The surfaces have substantially a point contact with a number of circumferentially spaced ball members 30 floatingly mounted in an annular cage 32 fixed to a carrier member 34 rotatable about the axis of the shaft 10. Substantially opposite portions of the balls in turn have substantially a point contact with the concave internal surfaces 36 and 38 of a pair of spaced, inner annular ball races 40 and 42 axially slidable secured to an intermediate shaft 43.

The inner and outer races and balls are loaded into driving contact with each other by a number of fluid pressure operated servos 44 each having a piston 46 secured to a race member and operating in a cylinder 48. The servos not only apply an axial pressure against the races, but also provide for an adjustment of the speed ratio of the ball drive in a manner to be described.

The carrier 34 is adapted to be held against rotation to condition the ball drive for an underdrive or overdrive by the application of a fluid pressure or otherwise actuated brake band 50 to the drumlike extension 52 of the carrier.

The ball drive operates in a known manner upon application of brake 50, the rotating outer race members 22 and 24 providing a point contact drive of balls 30 in the same direction to drive the inner race members 40 and 42 and intermediate shaft 43 in the opposite direction. More specifically, with the carrier held stationary, the pistons 46 are actuated to axially move the inner races 40 and 42 together while separating the outer races 22 and 24 to permit the balls 30 to be displaced radially outwardly. Accordingly, point contacts are made at points 54 and 56 on the outer and inner races respectively, conditioning the ball drive for a maximum underdrive ratio of the inner races with respect to the speed of drive shaft 10. Progressive axial movement of pistons 46 to spread the inner races apart and outer races together permits the balls 30 to be displaced radially inwardly, moving the outer and inner race point contacts arcuately to the points 58 and 60 to obtain an overdrive of the inner races 40 and 42 with respect to the speed of drive shaft 10.

A neutral condition may be obtained by moving pistons 46 to relieve the loadings on all the race members, thereby interrupting the drive therebetween.

The intermediate shaft 43 is fixed to the sun gear member 64 of the gearset 15 for rotation thereof in the same direction. The gearset is of the simple three-element planetary type having a number of pinions (only one shown) 68 meshing with the sun gear and a ring or annulus gear 70. The pinions 68 are rotatably journaled upon a carrier 72 rigidly fixed for rotation with the carrier 34 of the ball drive mechanism 14. Ring gear 70 is connected by an axial extension 74 to the outer semi-toroidal shroud 76 of a rotatable impeller member 78 constituting one element of a hydrodynamic drive device or fluid coupling 16.

The coupling is of a known type having a row of spaced impeller blades 82 secured within the shroud 76, and facing a number of similarly shaped turbine blades 84 fixed within a semi-toroidal shroud 86 of a turbine member 88. The turbine 88 is in turn connected by a flange 90 to the power output shaft 92 of the transmission. The shrouds 76 and 86 of the coupling members together define a toroidal fluid cavity 91 for the circulation of fluid therein in a known manner to transmit the torque of the impeller to the turbine and therefore to the output shaft. The coupling is of the constantly filled type, i.e., it is constantly filled with fluid, from a source not shown, so as to be operative at all times to transmit the torque output from the ring gear 70 to the output shaft 92 in a manner to cushion the drive therebetween.

The transmission as a whole is conditioned for an underdrive of the output shaft 92 with respect to the speed of input shaft 10 by application of brake 50 to hold carrier members 34 and 72 stationary. With the ball drive speed ratio set to provide a maximum underdrive of the inner races 40 and 42 with respect to input shaft 10, clockwise rotation of shaft 10 in the direction of arrow 93 drives outer race members 22 and 24 and balls 30 in the same direction, rotating inner race members 40 and 42, intermediate shaft 43 and sun gear 64 in a counterclockwise direction and at a reduced speed. Accordingly, ring gear 70 is driven in a clockwise direction about the stationary carrier 72 to drive output shaft 92 through the fluid coupling 16 in the same direction as input shaft 10 and at a speed reduction determined by the ratios of the ball drive and gearset units. Progressive adjustment of the ball drive speed ratio by movement of pistons 46 to change the ball drive ratio from an underdrive to an overdrive of the inner races will progressively increase the speed of sun gear 64 to therefore progressively decrease the speed differential between ring gear 70 (and output shaft 92) and the input shaft 10 until the ratios of the ball drive unit and the planetary gearset unit are equal. At this point, the transmission is conditioned for a one-to-one drive ratio and release of the brake band 50 will maintain the units in this drive ratio due to the internal friction of the system. In effect, therefore, the ball drive and gearset are locked up for a direct drive, equalizing the loadings on the cooperating members of the different units. The friction losses are therefore reduced and the operational efficiency and wear-life of the parts are increased. The output shaft 92 therefore rotates essentially at the speed of input shaft 10, the hydraulic losses through coupling 16 being nominal.

As stated previously, a neutral condition can be obtained by moving the pistons 46 to release the axial loading pressure on the ball races to terminate the drive therebetween.

A reverse drive may be obtained by means of a clutch 94 connecting the input shaft 10 directly to the sun gear 64 and bypassing the ball drive 14. The clutch is of a known fluid pressure actuated type having a number of spaced annular friction discs 96 splined to an extension 98 of shell member 18 and interleaved with annular friction discs 100 splined to intermediate shaft 43. The timed engagement of clutch 94 and brake 56, and release of the loading pressure on the ball races, therefore drives sun gear 64 in the same direction as input shaft 10 to rotate pinion 68 in the opposite direction about the stationary carrier 70, thereby driving ring gear 70 and output shaft 92 in a direction opposite to that of shaft 10 and at a reduced speed determined solely by the ratio of the gearset 15. The inoperativeness of the friction drive 14 therefore eliminates friction losses during this reverse drive and provides higher operational efficiencies.

FIGURE 2 illustrates a different embodiment of the invention, this figure differing from the FIGURE 1 showing by the substitution of a friction disc drive 102 for the ball drive 14 of FIGURE 1, and the insertion of a fluid coupling 104 in the connection between sun disc 106 and sun gear 107 in FIGURE 2 instead of in the position shown in FIGURE 1. The other details and connections of FIGURE 2 remain the same as in FIGURE 1 and further repetition is believed to be unnecessary. As to the differences, FIGURE 2 shows a drive shaft 108 connected by a shell member 110 to the ring or annulus member 112 of the variable speed disc drive 102. The ring member comprises a number of oppositely facing spaced conical driving discs 114 axially slidably splined to the shell 110, and having contact rims 116 engaging the cooperating conical surfaces 118 of a planet disc 120. The opposite peripheral portions of the planet disc engage the contact rims 122 of a number of spaced conical sun discs 123 axially slidably splined to an intermediate shaft 124.

The planet disc 120 is axially slidably and rotatably mounted on a pinion shaft 126 supported for a radial movement in either direction in a rotatable carrier member 128. This support could consist, for example, of a pin and slot type connection or any other suitable adjustable connector. The carrier can be held stationary as in FIGURE 1 to provide a reaction for the disc drive and gearset 15' by the application of a fluid pressure actuated band 129.

The disc drive operates in a known manner producing a sliding fluid friction drive between the members through the agency of a thin film of fluid sprayed or otherwise drawn into the contact region or patch between the ring and sun contact rims and planet disc. The contact rims and cone disc are loaded into driving engagement with each other by a number of pistons 130, 132 operating in fluid pressure cylinders 134, 136 and apply an axial pressure against the slidable left and right hand ring and sun discs 114 and 123, respectively, as shown. The oppositely facing right and left hand splined discs 112 and 123, respectively, are substantially fixed against axial sliding movement against backing members, not shown. The rotation of ring discs 114 therefore rotates planet disc 120 in the same direction to rotate sun discs 123 in the opposite direction. The speed ratio of the discs drive is adjustable to vary the input to output shaft speed ratio in finite amounts by radial movement of the pinion shaft 126 in either direction, with respect to the axis of carrier 128, to change the radial position of disc 120 with respect to the points of contact with the ring and sun discs. That is, the speeds at which disc 120 is driven by ring discs 114, and the speeds at which the cone disc 120 drives sun discs 123 change in inverse proportion to the change in the radial distance of the points of contact from the axis of rotation of the planet disc, due to the changes in peripheral velocity at the points of contact.

In the position shown, the planet disc is adjusted to produce its maximum underdrive of the sun discs, with the distance from the ring contact rims 116 to the axis of the pinion shaft 126 being at a maximum, while the distance from the axis to the sun contact rims 122 is at a minimum. Accordingly, drive of planet disc 120 by ring discs 114 will underdrive sun discs 123 to drive shaft 124 at a speed reduced from that of input shaft 108. Radial displacement of the pinion shaft 126 towards the ring discs 114 decrease the distance from the ring contact rims 116 to the shaft axis, thus increasing the speed of rotation of the hub of planet 120. A corresponding increase in the peripheral speed of its points of contact with the sun discs 123 results due to the increased radial distance between the sun disc contact rims and the planet disc axis. The net change results in an increase in speed of sun discs 123 as compared to the speed for the previous setting of the pinion shaft 126. Further adjustment of pinion shaft 126 can be made in finite amounts to a predetermined minimum overdriven ratio at which the sun discs rotate at a speed faster than the speed of input shaft 10.

It should be noted that the pistons 130, 132 are actuated to move discs 114 and 123 in timed relationship with the radial movement of pinion shaft 126 to accommodate the axial movement of disc 120 on its splines.

The intermediate shaft 124 is drivingly connected by a flange member 138 to the outer semi-toroidal shroud 140 of a rotatable impeller 142 forming one element of the fluid coupling 104. The impeller has a number of blades 144 secured to shroud 140 and facing a number of similarly shaped blades 146 secured within an outer shroud 148 of a turbine member 150. The shrouds together define a toroidal cavity 152 within which fluid circulates in the same manner as in coupling 16 of FIGURE 1 to transmit the torque of the impeller to the turbine. The turbine is connected directly to sun gear 64' by a member 154.

In operation, initially, reverse clutch 94' and band 129 are disengaged, thereby preventing a drive to the output shaft. The disc drive and gearset merely rotate freely with respect to the stationary ring gear 70', since there is no reaction member available. To provide a drive, band 129 is engaged, and the disc drive 102 is adjusted by movement of pinion shaft 126 and pistons 130, 132 to provide the particular speed ratio desired, the normal starting range being the lowest underdrive ratio. Clockwise rotation of input shaft 108 in the direction of arrow 150 therefore rotates ring discs 114 and planet disc 120 in the same direction. The sun discs 123 accordingly are rotated in a counterclockwise direction at a reduced speed with respect to shaft 108, rotating shaft 124, impeller 142, turbine 150 and sun gear 64' substantially at the same speed and in the same direction, which is opposite to that of the input shaft. Ring gear 70' is therefore rotated clockwise about the stationary carrier 72' to rotate shaft 92' in the same direction and at a speed determined by the overall reduction through the disc drive and gear units. To increase the speed of output shaft 92', the pinion shaft 126 can be moved radially outwardly towards the ring discs 114 to progressively increase the speed of a planet disc 120, sun discs 123, sun gear 64', and ring gear 70', until the drive ratios in the two units are equal, whereby a one-to-one ratio of output shaft 92' with respect to input shaft 10 is obtained. At this point, a lockup between the disc drive and gearset occurs, and brake 129 can be released.

A reverse drive is obtained by engaging clutch 94' and band 129 while releasing the axial pressure on the discs 114 and 123, thereby directly connecting input shaft 108 and intermediate shaft 124, bypassing the friction disc drive 102. Accordingly, the sun gear 64' will be rotated in the same direction and at the same speed as input shaft 108, except for hydraulic losses in coupling 16, to rotate ring gear 70' and output shaft 92' in the opposite direction and at a speed reduced from that of shaft 108 and determined solely by the reduction through the gearset. With the insertion of the fluid coupling between the sun discs 123 and sun gear 64', the torque capacity of the coupling will be at a maximum when the disc drive is conditioned for a reduction or underdrive, and at a minimum when the disc drive is conditioned for an overdrive ratio.

While the invention has been shown in its preferred embodiments, it will be clear to those skilled in the arts to which the invention pertains that many changes and modifications may be made thereto without departing from the scope of the invention.

I claim:

1. A variable speed transmission having rotatable input and output shafts, and means operatively connecting said shafts, said means including a selectively operable variable speed friction drive mechanism and a gearset each having a plurality of rotatable members, releasable means biasing the members of said mechanism together rendering it operable to transmit a drive therethrough, means connecting said input shaft to one of the members of said mechanism and one of the members of said gearset to said output shaft, means connecting a plurality of said members of said mechanism and said gearset together, brake means operable for holding a plurality of said connected members stationary to condition said mechanism and gearset for one drive range of operation upon operation of said mechanism providing an infinite number of speed ratio changes in said range, and selectively engageable means operatively connecting said input shaft to said one member of said gearset bypassing said mechanism and establishing a reverse rotation of said output shaft with respect to the direction of rotation during establishment of said one drive range, the engagement of said latter means and the rendering of said mechanism inoperatble by the release of said releasable means permitting said reverse rotation.

2. A variable speed transmission having rotatable input and output shafts, and means connecting said shafts, said means including a selectively operable variable speed planetary friction disc drive mechanism and a planetary gearset each having sun and ring and planet carrier and other rotatable members, means connecting one of said disc members to said input shaft and a member of said gearset to said output shaft, other means connecting another disc member and another gearset member together, means connecting a further member of each of said mechanism and gearset to each other, brake means for holding both of the further members stationary to condition said mechanism and gearset for one drive range of operation upon operation of said mechanism providing an infinite number of speed ratio changes in said range, the attainment of equal speed ratios in said mechanism and gearset locking up said mechanism and gearset for rotation as a unit upon release of said brake means to provide a direct drive therethrough from said input shaft.

3. A variable speed transmission having rotatable input and output shafts, and means connecting said shafts, said means including a selectively operable variable speed planetary friction ball drive mechanism and a planetary grearset each having sun and ring and planet carrier and other rotatable members, means connecting a race member of said mechanism to said input shaft and a member of said gearset to said output shaft, other means connecting another race member and another gearset member together, means connecting a further member of each of said mechanism and gearset to each other, brake means for holding both of the further members stationary to condition said mechanism and gearset for one drive range of operation upon operation of said mechanism providing an infinite number of speed ratio changes in said range, the attainment of equal speed ratios in said mechanism and gearset locking up said mechanism and grearset for rotation as a unit upon release of said brake means to provide a direct drive therethrough from said input shaft.

4. A variable speed transmission having rotatable input and output shafts, and means connecting said shafts, said means including a selectively operable variable speed friction disc drive mechanism and a gearset each having sun and ring and planet carrier and other rotatable members, means connecting the ring disc member of said mechanism to said input shaft, a hydrodynamic drive device connecting the ring member of said gearset to said output shaft cushioning the drive therebetween, other means connecting the mechanism sun disc member and gearset sun member together, means connecting the carrier members of each of said mechanism and gearset to each other, brake means for holding said carrier members stationary to condition said mechanism and gearset for one drive range of operation upon operation of said mechanism providing an infinite number of speed ratio changes in said range, the attainment of equal speed ratios in said mechanism and gearset locking up said mechanism and gearset for rotation as a unit upon release of said brake means to provide a direct drive therethrough from said input shaft.

5. A variable speed transmission having rotatable input and output shafts, and means connecting said shafts, said means including a selectively operable variable speed friction ball drive mechanism and a gearset each having sun and ring and planet carrier and other rotatable members, means connecting the ring race of said mechanism to said input shaft and the ring member of said gearset to said output shaft, a hydrodynamic torque transmitting means connecting the mechanism sun race and gearset sun member together cushioning the drive therebetween, means connecting the carrier members of each of said mechanism and gearset to each other, brake means for holding said carrier members stationary to condition said mechanism and gearset for one drive range of operation upon operation of said mechanism providing an infinite number of speed ratio changes in said range, the attainment of equal speed ratios in said mechanism and gearset locking up said mechanism and gearset for rotation as a unit upon release of said brake means to provide a direct drive therethrough from said input shaft.

6. A variable speed transmission having rotatable input and output shafts, and means connecting said shafts, said means including a variable speed friction drive mechanism and a gearset each having a plurality of rotatable members, means connecting said input shaft to a member of said mechanism and a member of said gearset to said output shaft, means connecting a plurality of said members of said mechanism and said gearset together, brake means holding a plurality of said connected members stationary to condition said mechanism and gearset for one drive range of operation providing an infinite number of speed ratio changes in said range, and means rendering said drive mechanism inoperable and operatively connecting said input shaft to said one member of said gearset establishing a reverse rotation of said output shaft with respect to the direction of rotation during establishment of said one drive range.

7. A variable speed transmission having rotatable power input and output shafts, and means operatively connecting said shafts, said means including a selectively operable variable speed planetary friction drive unit and a planetary gearset unit each having sun and ring and planet carrier and other rotatable members, means connecting said input shaft to one of the ring and sun members of the drive unit, and means connecting one of the sun and ring members of said gearset unit to said output shaft, means connecting the others of said sun and ring members of said units together, means connecting the planet carrier members of said units together, releasable means biasing said friction drive members of said drive unit together rendering it operable to transmit a drive therethrough, brake means holding said connected planet carrier members stationary to condition said units for one drive range of operation upon operation of said drive unit providing an infinite number of speed ratio changes in said range, and selectively engageable clutch means operatively connecting said input shaft to said one member of said gearset unit bypassing said drive unit and establishing a reverse rotation of said output shaft with respect to the direction of rotation during establishment of said one drive range, the engagement of said clutch means and the release of said releasable means rendering said drive unit inoperable and permitting said reverse rotation.

References Cited by the Examiner
UNITED STATES PATENTS

| | | | |
|---|---|---|---|
| 1,728,383 | 9/29 | Weiss | 74—690 |
| 1,850,189 | 3/32 | Weiss | 74—690 |
| 1,985,110 | 12/34 | Sharpe | 74—690 |
| 2,079,680 | 5/37 | Chilton | 74—796 |
| 2,093,236 | 9/37 | Dodge et al. | 74—691 |
| 2,701,970 | 2/55 | Kraus | 74—796 |
| 2,814,205 | 11/57 | Arato | 74—190.5 |
| 2,849,885 | 9/58 | Beier | 74—190.5 |
| 2,924,992 | 2/60 | Edsall | 74—688 |
| 2,982,152 | 5/61 | De Lorean | 74—688 |
| 2,983,164 | 5/61 | Herndon et al. | 74—688 X |

DON A. WAITE, *Primary Examiner.*